Oct. 25, 1932.  A. KINDELMANN  1,884,730
WING SHUTTER FOR MOTION PICTURE MACHINES
Filed March 1, 1930

INVENTOR
Albert Kindelmann
BY
Howard W. Dix
ATTORNEY

Patented Oct. 25, 1932

1,884,730

UNITED STATES PATENT OFFICE

ALBERT KINDELMANN, OF FLORAL PARK, NEW YORK, ASSIGNOR TO INTERNATIONAL PROJECTOR CORPORATION, OF NEW YORK, N. Y., A CORPORATION OF DELAWARE

WING SHUTTER FOR MOTION PICTURE MACHINES

Application filed March 1, 1930. Serial No. 432,305.

This invention relates to new and useful improvements in shutters for motion picture apparatus and has particular reference to new and improved shutters that are adapted to projectors and are to be positioned at the rear of the projection head and between it and the source of projection light.

A main object of the invention is to provide a simple, compact, efficient shutter device which will act as usual in all the capacities as a shutter and at the same time will efficiently act to keep cool the film and the head near the aperture opening and to dissipate the hot air in the vicinity of the head and the film without likelihood of either cracking or breaking the condensers or of getting the film and the head dirty.

A further object is to provide a simple, improved device to achieve the above objects and to produce the same in an inexpensive manner and to provide a shutter that requires minimum amount of space and power to operate.

Further and more specific objects, features, and advantages will more clearly appear from the detailed description given below when taken in connection with the accompanying drawing which forms part of the specification and which illustrate one present preferred form of the invention.

In general, the invention which is extremely simple, comprises a shutter blade of the usual type which has provided thereon preferably on one side thereof, a simple, angularly disposed wing or plate. This wing is preferably mounted on the shutter blade on the side adjacent the film and opposite the side of the blade adjacent the source of the projection light. The wing is mounted on the blade so that its greatest length or dimension forms a considerable angle to the radius of the blade and with the wing or projecting portion along its width or shortest dimension also arranged at an angle to the direction of motion thereof and preferably with the one surface of the wing sloping away from the direction of rotation or movement of the blade.

The functional effects which this simple wing device produces are rather marked and effective. As the blade rotates, it has been found from actual tests, that the wing or projecting element produces a gentle suction from the film toward the shutter, and that a centrifugal throw of air outward in the plane of the blade takes place.

On the side of the blade near the source of the projection light, apparently no current of air is established, but merely an agitation of chopping action which does not produce any tendency to suck air from the light beam or from the arc toward the film. The side of the shutter toward the beam is perfectly smooth. It has been found that back of the wing element a sort of vacuum is formed which tends to create the air current above mentioned. When this particular wing element is not used, but, as is usual, the ordinary fan blade shutter is employed, then the air is driven by the blade toward the film and the head to cool them but it is noticed that in this case, the fan action pulls the dirty heated air from the arc and the beam and throws it toward the film and the head which therefore soon get dirty and are not materially cooled. With the improved invention herein, however, these objections are eliminated.

Thus the invention will permit the efficiency of an ordinary simple shutter blade to be greatly increased by the addition of this wing element which can be made and attached with practically no expense at all and without adding to any practical extend to the power consumption for running the machine.

The preferred embodiment of the machine is illustrated in the drawing, of which, Fig. 1 is a somewhat diagrammatic view of the side of the lens unit and the shutter casing and the film and the shutter, showing the action of the shutter on the air in the vicinity;

Figure 2:
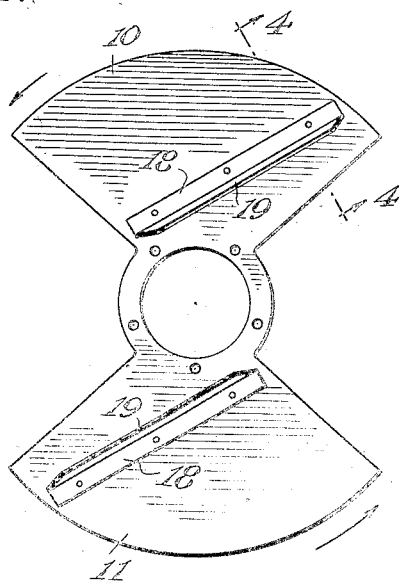
Fig. 2 is a front elevation of the improved shutter.
Figure 3:
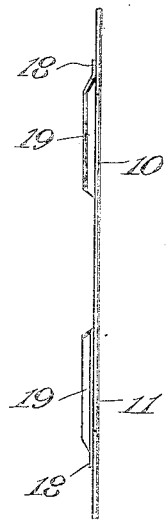
Fig. 3 is a side elevation of the shutter.
Figure 4:
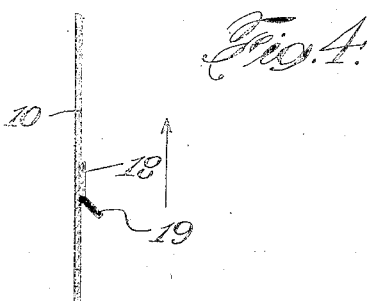
Fig. 4 is a cross section of the improved shutter taken on the line 4—4 of Fig. 2.

The invention as disclosed in the drawing, which is the present preferred form thereof, comprises an ordinary shutter having the two oppositely disposed blade portions 10 and 11 adapted to rotate in the direction indicated by the arrows in Fig. 2. These shutter blade surfaces are preferably disposed in a plane at right angles to the axis of the shutter shaft. The blades of the shutter may be of any desired construction or material. The improved attachment or plate or wing, herein disclosed may be positioned on any blade and the cooling effect will be obtained so long as there are not enough holes in the blade to destroy the desired amount of suction created by the plate or wing. With this understanding the blades may be hereinafter referred to as being substantially imperforate.

This type of shutter as embodying the invention is preferably used in connection with a projection head and is disposed between the film gate and the condensers such as 12 which are located in a tube 13. The shutter is surrounded by a guard casing such as 14. On the other side of the casing 14 is located the film 15. The casing 14 is preferably provided with necessary openings such as 16 and 17 to permit the projection light to pass and to fall upon the film 15.

In the ordinary operation of the device, the shutter rotates within the casing 14 and acts in the usual manner to cut off the light to allow the film to move to register the next exposure with the aperture opening. With this improved type of shutter disposed at the rear of the film and between it and the source of the projection light, considerable heat is encountered and must be dissipated in order to prevent the film and the head from becoming too hot. This invention aims to provide simple means whereby the shutter itself is relied upon to move away enough of the heat of the beam to prevent the undue heating of the film and the head, and at the same time, it is designed to achieve this heat dissipation without requiring too complicated a shutter and without setting up too strong air currents in the vicinity of the film which might cause film vibration or fluttering and other objectionable features.

Furthermore it is not desired to create any air currents flowing from the light beam to the film as this sort of air current increases the heat in the neighborhood of the film and head. It has been found that the movement of the air from near the light to the film carries with it any dirt which may be in the beam in the vicinity of the arc and the source of light. In fact, practically, it was found that much of the gases and dirt developed by the lamp were conveyed to the film and projection head. This is particularly undesirable.

To move the heated air away from the film without drawing it from the source of the projection light at the same time, the invention herein especially contemplates that the blades 10 and 11 be provided with simple wing elements on the side of the blades adjacent the film. These blades are substantially imperforate so that no substantial detrimental amount of air will be sucked through any major openings in them by the action of the wing element. Preferably these elements are in the form of plates such as 18 which act as bases and are fastened either fixedly or adjustably to the surfaces of the blades 10 and 11 by any suitable means. These base plates are preferably much longer than they are wide and their length is arranged at rather a large angle with regard to the radius of the blade. With this invention it has been found by repeated experiments, that the most desirable degree of suction is produced when the base plates are disposed in the manner shown in the drawing which is about 60 degrees to the radius. It has been found, however, that this angle may be varied from 50 degrees to 75 degrees and still obtain highly satisfactory results. The angle may be decreased as low as 15 to 20 degrees with an effective result.

Each base plate is provided along its rear edge with an inclined projecting wing portion such as 19. This wing is inclined preferably about 45 degrees to the surface of the blade to which it is attached as this angle is one that has been found to produce exceptionally good results. It has been found that this angle may be varied anywhere from 40 to 50 degrees while still maintaining satisfactory operation. It is of course not intended to limit this invention to the particular shapes and angular dispositions recited herein since other arrangements may be employed with similar and desirable and satisfactory results.

Figure 1:
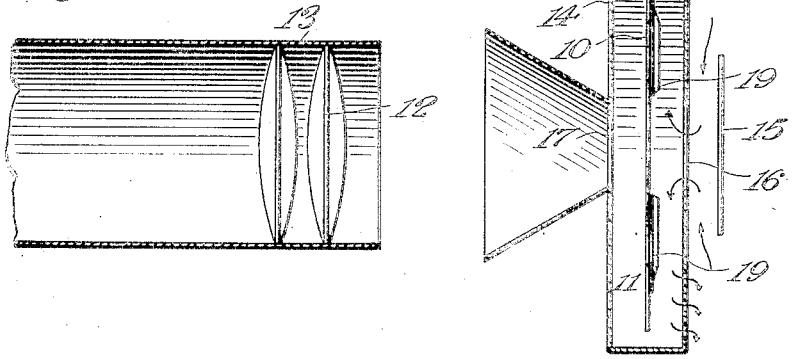

As a result of the rotation of the improved winged shutter herein described, there is produced in the air on both sides of the shutter the following desired effects:

On the side of the shutter toward the film there is produced an air suction which is gentle so as not to disturb the film but which is sufficient to draw the warm air away from the film toward the shutter. The shutter will throw this heated air outwardly along the plane of the shutter in a centrifugal manner as shown by the arrows in Fig. 1. This air is permitted to escape through the holes in the casing 14. By reason of so moving the air, the film is kept cool and there is produced a withdrawal of the air from the film and with a centrifugal throw the air is moved outward from the shutter. It will also be noted that the air on the side of the shutter toward the light source is only chopped or agitated so that there is produced therein no air currents flowing along the beam toward the shutter and particularly toward the film. Therefore dirt and heat in the light beam of the arc light will not in this case reach the film.

This invention therefore comprises a shutter disposed between the film and the source of the light and provides means which will produce a quiet suction of air from the film toward the shutter, a centrifugal throwing of this drawn air outwardly along the shutter, and a mere chopping or agitation of the air on the side of the shutter toward the source of light for the purposes and reasons above mentioned. The invention is simple and inexpensive to apply and requires practically no alteration of the parts whatsoever. It will also be noted from the drawing and the description that the plates or wings may be readily attached to a shutter.

While the invention has been described in detail and with respect to the present preferred form thereof, it is not to be limited to such details and forms since many changes and modifications may be made and the invention embodied in other forms and modifications without departing from the spirit and scope of the invention in its broadest aspects. Hence it is desired to cover any and all forms and modifications which may come within the language or scope of any one or more of the appended claims.

What is claimed, is,

1. A shutter for motion picture projectors which comprises an imperforate blade and an air disturbing wing element fastened on one side of said blade, the wing element being disposed with its length along the surface of the blade at an angle of about 60 degrees to the radius of the blade.

2. A shutter for motion picture projectors which comprises an imperforate blade and an air disturbing wing element fastened on one side of the blade, the wing element being disposed with its length along the surface of the blade at an angle of about 60 degrees to the radius of the blade and at an angle of about 45 degrees to the surface of the blade.

3. A shutter for motion picture projectors which comprises an imperforate blade and an air disturbing wing element fastened on one side of the blade, the wing element being disposed with its length along the surface of the blade at an angle of about 60 degrees to the radius of the blade and disposed at an angle of about 45 degrees to the surface of the blade, the wing element being positioned to point or slope away from the direction of rotation of the shutter.

4. A shutter for motion picture projectors which comprises a blade and an air disturbing wing element disposed on one side of the blade, the wing element comprising a base plate fastened to the surface of the shutter blade with its length disposed along the blade at an angle of about 60 degrees to the radius of the blade, said wing element further comprising a projecting wing portion extending from the rear edge of said base plate and at an angle of about 45 degrees to the surface of the blade.

5. A shutter for motion picture projectors which comprises a blade and an air disturbing wing element disposed on one side of the blade, the wing element comprising a base plate fastened to the surface of the shutter blade with its length disposed along the blade at an angle of about 60 degrees to the radius of the blade, said wing element further comprising a projecting wing portion extending from the rear edge of said base plate at an angle of about 45 degrees to the surface of the blade, said wing element being disposed on the side of the shutter blade adjacent the film.

6. A shutter adapted to rotate in a beam of light and between the source of the light and a film, said shutter comprising a blade, a base plate fastened to the side of the blade adjacent the film, said base plate arranged at an angle of about 60 degrees to the radius of the blade, a wing portion disposed at the rear of the base plate and sloping upwardly and away from the direction of motion of the blade at an angle of about 45 degrees to the surface of the blade.

7. A shutter for motion picture projectors having a substantially imperforate blade, and an air disturbing wing element fastened on the surface on the side of the blade nearest the aperture opening of the projector, said wing element being positioned on said blade diagonally thereof and at an angle to the surface of the blade and at an angle to the radius of said blade.

8. A shutter for motion picture projectors having substantially imperforate blades, an air disturbing wing element fastened to one side of each blade, each of said wing elements being disposed at an angle of from 50–75 degrees with respect to the radius of the blade and at an angle with respect to the surface of the blade.

9. A shutter for motion picture projectors having substantially imperforate blades, an air disturbing wing element fastened to one side of each blade, each of said wing elements being disposed at an angle of from 50–75 degrees with respect to the radius of the blade and at an angle of from 40–50 degrees with respect to the surface of the blade.

ALBERT KINDELMANN.